United States Patent
Vonend et al.

(10) Patent No.: US 11,912,373 B2
(45) Date of Patent: Feb. 27, 2024

(54) BICYCLE REAR WHEEL ARRANGEMENT

(71) Applicant: SRAM DEUTSCHLAND GmbH, Schweinfurt (DE)

(72) Inventors: Andreas Vonend, Schweinfurt (DE); Jakob Rohmer, Wuerzburg (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 118 days.

(21) Appl. No.: 17/181,141

(22) Filed: Feb. 22, 2021

(65) Prior Publication Data
US 2021/0261218 A1 Aug. 26, 2021

(30) Foreign Application Priority Data
Feb. 22, 2020 (DE) .................... 10 2020 001 147.0
Jan. 29, 2021 (DE) .................... 10 2021 000 448.5

(51) Int. Cl.
*B62M 9/10* (2006.01)

(52) U.S. Cl.
CPC ..................... *B62M 9/10* (2013.01)

(58) Field of Classification Search
CPC ........................................................ B62M 9/10
USPC ................................................. 474/160, 152
See application file for complete search history.

(56) References Cited

U.S. PATENT DOCUMENTS

| | | | | |
|---|---|---|---|---|
| 5,954,604 A | * | 9/1999 | Nakamura | F16G 13/06 |
| | | | | 474/158 |
| 10,160,030 B2 | | 12/2018 | Earle et al. | |
| 2016/0257376 A1 | * | 9/2016 | Hölle | F16H 55/30 |
| 2018/0079467 A1 | * | 3/2018 | Hirose | F16H 55/30 |
| 2019/0061875 A1 | * | 2/2019 | Reineke | B62M 9/126 |
| 2019/0084646 A1 | * | 3/2019 | Emura | F16H 57/0025 |

FOREIGN PATENT DOCUMENTS

| | | | | | |
|---|---|---|---|---|---|
| DE | 102017008074 | | 2/2019 | | |
| DE | 102018133324 | | 8/2019 | | |
| DE | 102019206786 | A1 * | 11/2019 | ............. | B62M 9/12 |
| EP | 1621457 | | 2/2006 | | |
| EP | 3507183 | | 7/2019 | | |
| WO | 2018041409 | | 3/2018 | | |
| WO | WO-2018041409 | A1 * | 3/2018 | ............. | B62M 9/10 |

OTHER PUBLICATIONS

Luke, Jack, "Rotor 1x13 hydraulic groupset: weights, price, specs, details", bikeradar.com, Feb. 25, 2019, 11 pages.

* cited by examiner

*Primary Examiner* — Gene O Crawford
*Assistant Examiner* — Emily R Kincaid

(57) ABSTRACT

A bicycle rear wheel sprocket arrangement comprises a carrier sprocket and a self-supporting sprocket cluster connected to the carrier sprocket on the outboard side in a connection region of the carrier sprocket. The sprocket arrangement comprises a plurality of further sprockets which are designed as sprocket rings. The sprocket rings are each arranged on the carrier sprocket in the connection region and each are connected to the carrier sprocket.

7 Claims, 12 Drawing Sheets

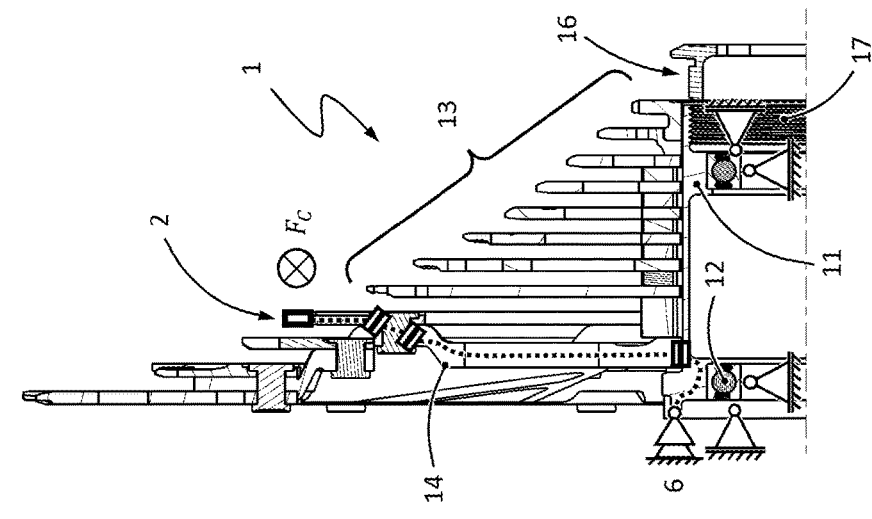
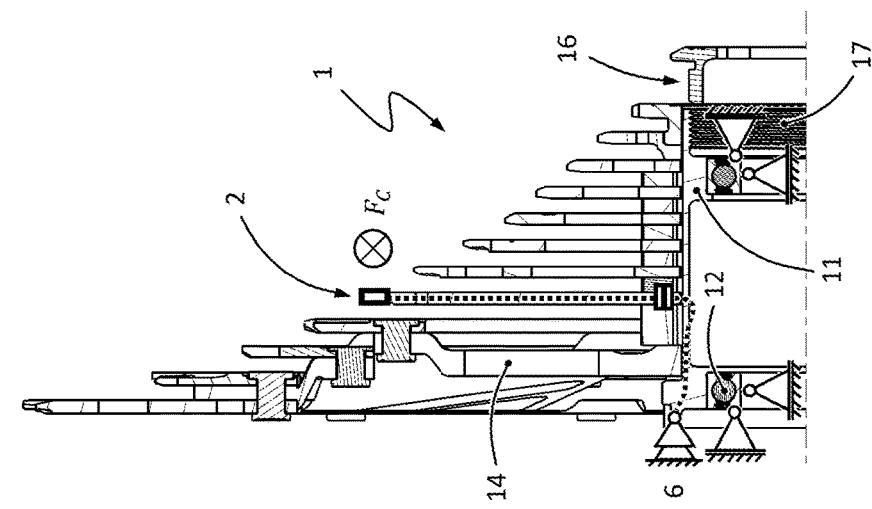
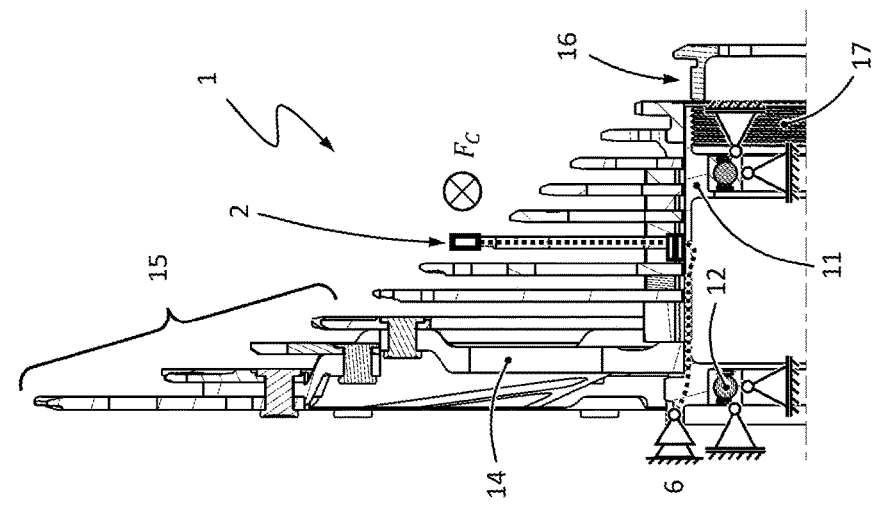

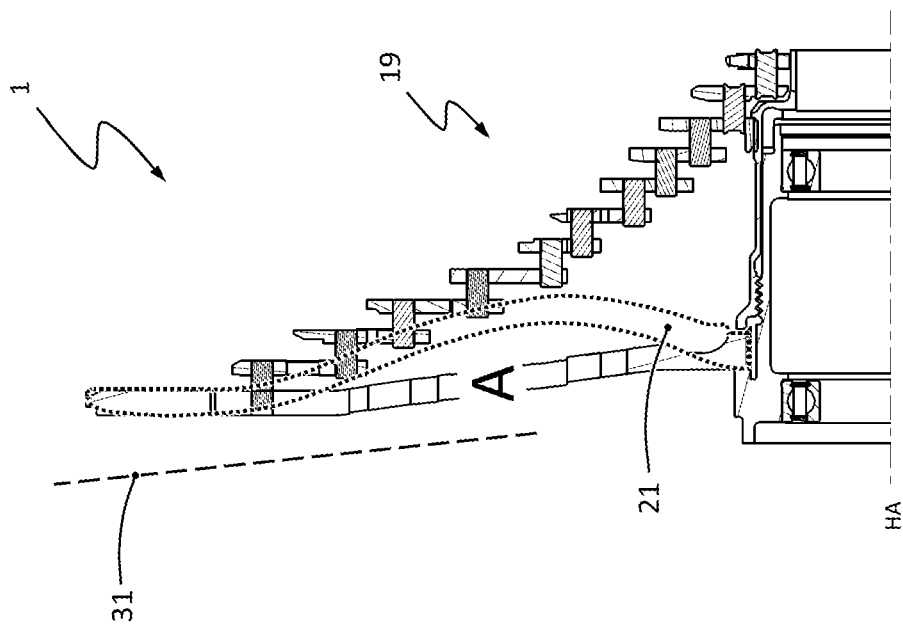

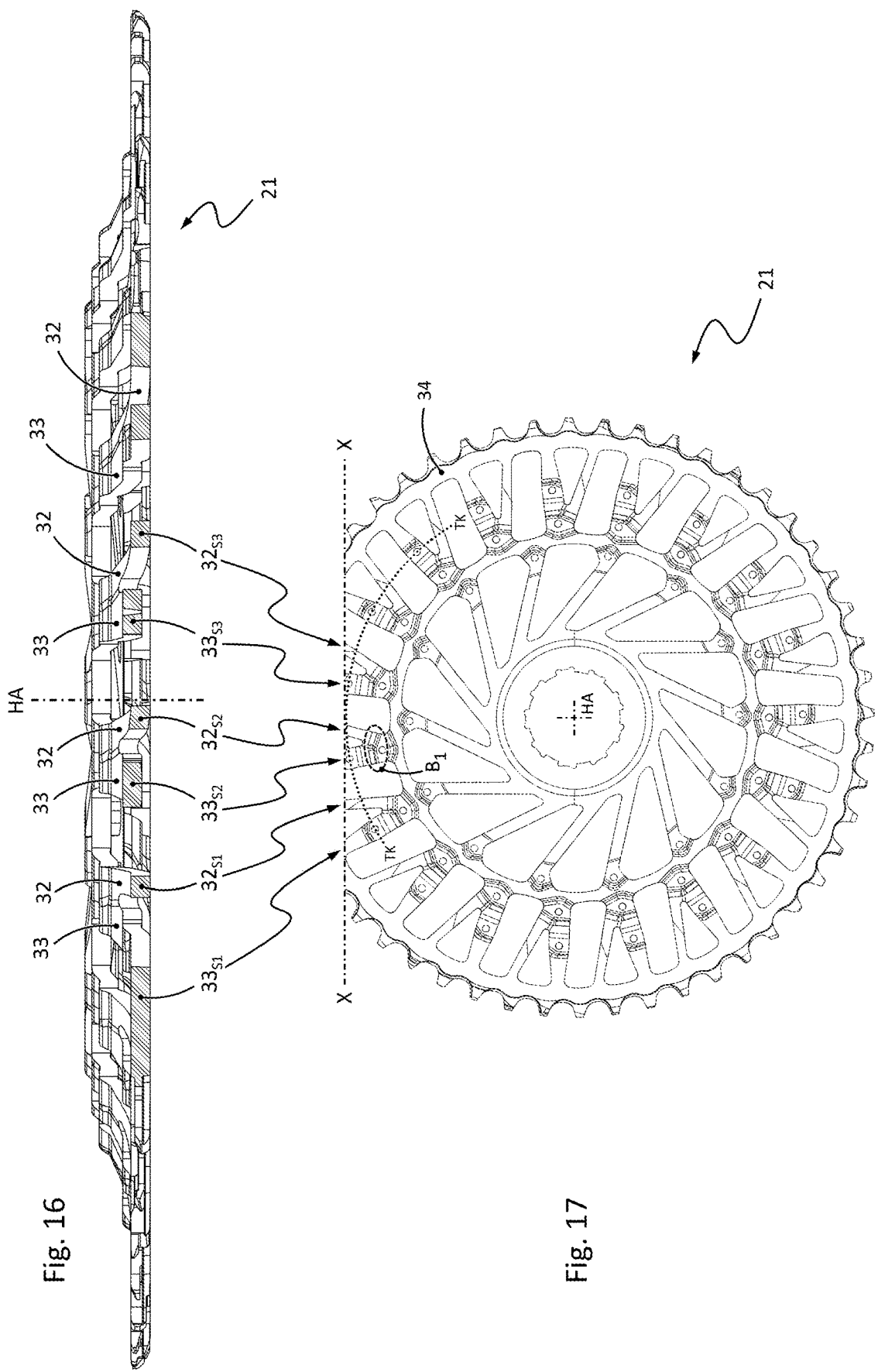

BICYCLE REAR WHEEL ARRANGEMENT

PRIORITY

This application claims priority to, and/or the benefit of, German patent applications DE 10 2020 001 147.0, filed on Feb. 22, 2020, and DE 10 2021 000 448.5 filed on Jan. 29, 2021, the contents of which are included by reference herein in their entirety.

FIELD OF THE DISCLOSURE

This disclosure relates to a sprocket arrangement for a rear wheel of a bicycle.

BACKGROUND

Rear wheel sprocket arrangements of the type in question, also more simply and synonymously referred to as a sprocket cassette or as a cassette in the bicycle sector and in the following description, form on the bicycle a constituent part of the drivetrain which serves to transmit the driving force from the chainring on the bicycle bottom bracket to the rear wheel.

Location or direction references used in the following description, such as "left", "right", "front", "rear", "upper", "lower", etc., correspond to the rider's perspective on a bicycle. The same correspondingly applies to the following direction references used in the description that are standard in the sector: "inboard" (left or towards the left) and "outboard" (right or towards the right), which specifically refer to shifting operations or sprocket positions on the cassette.

Bicycle sprocket cassettes comprise a plurality of sprockets which are spaced apart axially with respect to the rear axle and which have a graduated different number of teeth. Depending on the transmission ratio selected by the rider, the bicycle chain is placed on one of the sprockets by means of a shift mechanism, and thus determines, in interaction with the number of teeth of the chainring on the bottom bracket, the transmission ratio and the pedaling frequency desired by the rider.

In the last few years, the bicycle sector, especially in the field of mountain bikes, has switched over to reducing the number of the bottom bracket chainrings from the traditionally three different-sized chainrings initially to two chainrings and in the meantime to usually only a single chainring, at least in upper market segments. This simplifies the drivetrain and increases its reliability. For the rider, this also simplifies the shift actuation, reduced to only one shift lever, and shift logic.

Furthermore, there is thus also no need for the front derailleur in the region of the bottom bracket and also for its control, or for the devices required to fasten it to the bicycle frame and bicycle handlebars. Dispensing with the derailleur and additional chainrings as well as shift lever and accessories also entails a considerable weight reduction of the bicycle.

Even in the case of bicycles having an electric auxiliary drive, it is, inter alia, for reasons of installation space and to simplify the drivetrain that in most cases a plurality of shiftable chainrings are dispensed with, with only one chainring being relied upon.

Dispensing with that subfactor of the transmission ratio range on the bicycle that has been provided in the past by a plurality of chainrings on the bottom bracket and typically ranged between 180 to 200% has made it necessary to substantially increase the transmission ratio range provided by the sprocket cassette.

This need has led to the development of sprocket cassettes which have both very small sprockets down to 11 teeth or less on the outboard side and very large sprockets up to 50 teeth or more on the inboard side. Consequently, these cassettes attain transmission ratio ranges in the order of magnitude of 500% and can thus provide a suitable transmission ratio in virtually all riding situations.

However, sprocket cassettes having such large sprockets on the inboard side lead, inter alia, to weight problems, particularly if the cassettes are traditionally largely composed of individual disc-shaped sprockets, with each sprocket being directly arranged on the freewheel driver of the rear wheel hub.

The high weight of such sprocket cassettes is the result on the one hand of the disc-shaped sprockets (which for simplification are also referred to as plug sprockets) which become very large especially in the inboard direction and on the other hand of the redundancies, associated with the individual sprocket design, relating to the torque transmission from the radially outer sprocket teeth to the radially inner driver of the rear wheel hub. These redundancies lie especially in the fact that each individual sprocket forms its own torque transmission path from the radially outer sprocket teeth to the radially inner driver, which adds up to a large number of torque transmission paths which are arranged next to one another in parallel, and which are thus redundant, with a correspondingly high material outlay.

In order in particular to counter the weight problem of such sprocket cassettes, two basic main concepts have been pursued up until now. One of these concepts lies in the use of so-called sprocket spiders in which a plurality of adjacent sprocket rings are arranged on a common carrier.

Here, a sprocket ring is defined such that, unlike a disc-shaped cassette sprocket or plug-in sprocket, it is not arranged directly on the driver of the rear wheel hub and connected thereto in a torque-transmitting manner, but is designed as a radially comparatively narrow ring.

In the case of sprocket cassettes having a spider construction, the connection to the driver and the transmission of torque from the sprocket teeth to the driver thus occurs in each case in a bundled manner for usually two or more adjacent sprocket rings which are each fastened together on a spider.

However, the large number of sprockets of current cassettes in the range of typically ten or more sprockets leads to the need to provide either a plurality of relatively flat spiders and in each case to fasten typically 2 to 4 sprockets on each of the flat spiders, or to configure an individual sprocket spider three-dimensionally with a considerable thickness or extent in the axial direction so as thus to be able to accommodate a large number of sprocket rings next to one another on the spider.

These two known approaches for spider sprocket cassettes are thus not optimal with regard to the desired weight reduction and additionally lead to a complicated construction of the cassette with numerous assemblies which are complicated to manufacture and to assemble.

A further known concept for weight reduction of sprocket cassettes with a very high transmission ratio range lies in the sprocket cassette being at least partially designed as a self-supporting so-called sprocket cluster, also referred to as a dome cassette.

It is frequently the case here that all of the sprockets, apart from the largest sprocket on the inboard side, are either milled from one piece of solid material, or as many as possible of the intermediate sprockets situated between the largest and the smallest sprocket are designed as sprocket rings which are connected to one another by connecting elements such as rivets or pins to form a cone-like three-dimensional supporting structure. The last-mentioned variant is also referred to in the sector as a pinned sprocket cluster.

In general, and independently of the manufacturing technology, a self-supporting sprocket cluster can be defined as consisting of three or more sprockets with an inboard-side starting sprocket and an outboard-side end sprocket, with the starting sprocket and end sprocket being able to be connected to connection components such as a spider, carrier sprocket or driver, whereas the third sprocket, or customarily a plurality of intermediate sprockets arranged between the starting sprocket and end sprocket, is/are designed to be unsupported, has/have no dedicated or direct connection to the spider, carrier sprocket or driver, and instead is/are connected only directly or indirectly to the starting and the end sprocket.

However, the concept of the sprocket cluster is also limited by the ever-larger number of gears and sprocket sizes. Sprocket clusters milled from solid material require ever more complicated and thus more expensive production steps, whereas pinned sprocket clusters, given the large number of pin or rivet structures arranged in a row, give rise to an ever-higher manufacturing costs especially on account of the associated tolerance chains.

Proceeding from the above-described prior art, it is the object of the present disclosure to provide a sprocket arrangement whereby the described disadvantages of the prior art, both in terms of spider cassettes and with regard to dome cassettes, are overcome.

SUMMARY

In embodiments, a bicycle rear wheel sprocket arrangement comprises a carrier sprocket. A self-supporting sprocket cluster is connected to the carrier sprocket on the outward side in a connection region of the carrier sprocket. A plurality of further sprockets, which are designed as sprocket rings, are each arranged on the carrier sprocket in the connection region and are each connected to the carrier sprocket in the connection region.

BRIEF DESCRIPTION OF THE DRAWINGS

Embodiments of this invention will be described below by way of example with reference to the figures, in which:

FIGS. 2-4 show a sprocket arrangement with sprocket spider and plug-in sprockets according to the prior art, each in a schematic sectional view;

FIG. 2a is a key for symbols used in figures;

FIG. 9 shows a schematic superimposition of the sprocket arrangement according to the prior art according to FIG. 6 with a sprocket carrier of the embodiment according to FIGS. 7 and 8;

FIG. 16 shows a cross section of the carrier sprocket according to FIGS. 13 to 15;

FIG. 17 shows an outboard view of the carrier sprocket and that the cross section of the sprocket carrier of FIG. 16 is taken along line X-X;

DETAILED DESCRIPTION

Figure 1:
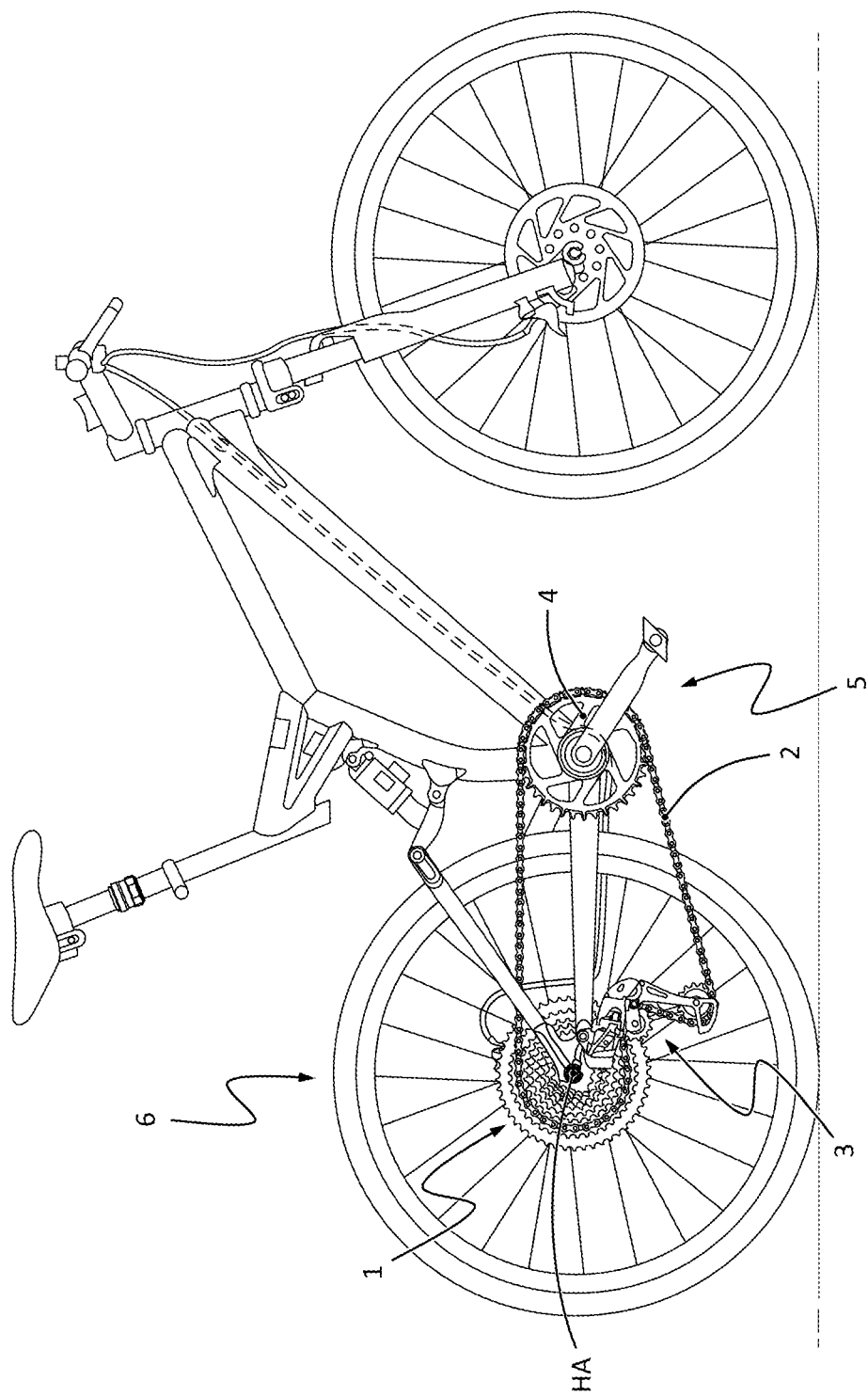
FIG. 1 shows a side view of a mountain bike having a single drivetrain, i.e., a single chainring and without a front derailleur.

According to the generic type, the sprocket arrangement comprises a carrier sprocket and a self-supporting sprocket cluster. The sprocket cluster is connected to the carrier sprocket in an outboard-side connection region of the carrier sprocket.

The sprocket arrangement is distinguished by a plurality of further sprockets, with the further sprockets being designed as sprocket rings. Each of the sprocket rings is arranged on the carrier sprocket in the connection region of the carrier sprocket, and each is connected to the carrier sprocket in the connection region.

The further sprockets or sprocket rings arranged in such a way on the carrier sprocket, in combination with the sprocket cluster likewise fastened on the carrier sprocket in its connection region, there is the resulting advantage that the sprocket cluster is in this way relieved of a plurality of sprockets, corresponding to the number of the sprocket rings, which are typically some of the largest sprockets of the sprocket cassette.

The sprocket cluster can thus be made significantly smaller, which substantially reduces the problems described above with regard to the production, tolerances and weight of the sprocket cluster. Since the volume of a cone, which is reduced both in diameter and proportionally in height, falls with the third power of the decrease, it is in this way possible simply by reducing the outside diameter and the width of a typically approximately cone-shaped sprocket cluster by for example 30% for the volume of the sprocket cluster to be reduced in order of magnitude to virtually a third.

Here, the sprocket rings can be connected to the carrier sprocket in different ways. According to one preferred embodiment, at least one of the sprocket rings is connected to the carrier pinion by means of a plurality of connecting elements. The connecting elements are, for example, screws, rivets, pins or clinch connections, with the latter being form-fitting or positive connections by clinching without using an additional material.

The pins, in the case of a pin connection with the carrier sprocket, can also either be provided in addition to the respective sprocket ring, or be formed in one piece with the sprocket ring, for example molded on.

According to a further preferred embodiment, at least one of the sprocket rings is connected to the carrier sprocket in an integrally bonded manner or by a material bond, for example by welding or adhesive bonding.

The aforementioned embodiments can also be combined with one another, so that one of the sprocket rings can, for example, be adhesively bonded or glued to the carrier sprocket, whereas a further sprocket ring is, for example, pinned or riveted to the carrier sprocket. Also, conceivable and envisaged is a combination of a plurality of methods at the same point of connection between a sprocket ring and the carrier sprocket, in particular a combination of material bonding and form-fitting engagement, such as for example an adhesive connection reinforced by form-fitting elements such as knurls or projections.

The same similarly applies to the connection between the carrier sprocket and sprocket cluster. This can also occur by connecting elements like those mentioned above, by a material bonded connection, or by a combination of these connection methods.

A particularly preferred embodiment provides for the carrier sprocket to have a dished design such that, in the connection region between the carrier sprocket and the sprocket rings, a cross-sectional contour of the carrier sprocket extends approximately parallel to the tooth tip contour of the sprocket arrangement.

This can be achieved, for example, by the carrier sprocket being designed, at least in certain regions, to be similar to a toroidal portion. This shape leads, in the connection region between the carrier sprocket, sprocket rings and sprocket cluster, due to the shortest connection paths, to minimized material expenditure and thus results in the desired low weight of the sprocket cassette.

Furthermore, these shortest connection paths also allow the stiffness and fatigue strength of the sprocket arrangement to be optimized in the connection region.

According to a further preferred embodiment, on one or more sprockets of the sprocket arrangement, the load flank of at least one outer link plate clearance tooth or release tooth has a bevelled shark tooth shape that is set back in the circumferential direction. As a result, the shifting precision can be improved over the entire service life of the sprocket cassette, shifting noise can be reduced, the wear of the sprocket cassette and chain is decreased, and the overall the service life of the drivetrain is increased.

The disclosure also relates to a modular system for providing a large number of different bicycle rear wheel sprocket arrangements. The modular system comprises at least one assembly series for at least one of the "carrier sprocket", "sprocket cluster" and "sprocket rings" assemblies, preferably in each case an assembly series for each of these assemblies.

Taking the example of the carrier sprocket, an "assembly series" is to be understood as meaning a series or array of carrier sprockets of different materials or of different manufacturing quality. For example, a carrier sprocket made of steel and a carrier sprocket made of aluminium are the basis of a "carrier sprocket" assembly series.

It is the case here that within each assembly series in each case connection interfaces with the other assemblies (i.e. in the example of the carrier sprocket, the connection interfaces with one of the sprocket rings, or the connection interfaces with the sprocket cluster) are uniformly defined in a shape-corresponding manner or are defined to mechanically correspond. This means that, by way of the uniformly defined connection interfaces, the respective assembly (for example the carrier sprocket), while maintaining the remaining assemblies (for example the sprocket rings and the sprocket cluster), can be exchanged for another assembly (for example for another carrier sprocket) from the same assembly series (for example from the "carrier sprocket" assembly series).

According to one possible embodiment, at least one of the connection interfaces of the carrier sprocket is designed as a combination interface for selectively receiving a sprocket ring or a sprocket cluster. In other words, this means that either a larger sprocket cluster can be fastened at the corresponding combination interface of the carrier sprocket (in which case a further, a more radially inward connection interface can then remain unused), or a sprocket ring is fastened at the combination interface, whereas a smaller sprocket cluster is fastened at the further, more radially inward connection interface.

FIG. 1 shows a mountain bike having a single drivetrain. Apart from the sprocket cassette 1, chain 2 and rear derailleur 3, the drivetrain comprises only a single chainring 4. As described above, the drivetrain is thereby simplified not only in terms of manufacturing, assembly effort and adjustment effort but also with regard to weight and in terms of the shifting operation by the rider.

Here, the transmission ratio range which is cancelled by the omission of further chainrings having a different number of teeth has to be compensated for by a correspondingly increased transmission ratio range of the sprocket cassette 1.

This is achieved in particular by the sprocket cassette 1 having some extremely large sprockets on the inboard side. The inboard side corresponds in FIG. 1, with reference to the drawing, to the rear side of the sprocket cassette 1. It can be seen that the largest sprocket of the sprocket cassette 1 has a considerably larger diameter and thus a considerably larger number of teeth than the chainring 4. In this way there is provided the step-down ratio required for steep climbs, i.e., a transmission ratio of less than one between the crank mechanism 5 and rear wheel 6.

FIGS. 2 to 4 show a bicycle sprocket cassette according to the prior art, in each case in an axial section through the rear axle of a bicycle according to FIG. 1. The symbols used in FIGS. 2 to 4 and also in part in FIGS. 5 to 8 are illustrated again in the form of a key in FIG. 2a.

Here, the symbol 7 represents the torque-locked connection between the driver 11 of the sprocket cassette 1, via a freewheel (not shown), and a rear wheel according to FIG. 1, the symbol 8 in each case represents a translational fixation of the driver 11 via its bearings 12 with respect to the bicycle rear axle, the dotted line according to symbol 9 represents a force flow or torque flow, here from the chain 2 through the sprocket cassette 1 to the rear wheel at 6, and the two block shapes 10 represent force-transmitting interfaces between the various assemblies of the sprocket cassette 1, or represent the application of the chain force $F_C$ directed here into the plane of the drawing.

The sprocket cassette 1 according to FIGS. 2 to 4 comprises a plurality of, here eight, individual sprockets designed as plug-in sprockets 13, and a sprocket spider 14 on which a further four individual sprockets, designed as sprocket rings 15, are arranged. The plug-in sprockets 13 and the sprocket spider 14 are axially braced in a customary manner on the driver 11 by a lockring 16 which can be screwed into an internal thread 17 of the driver 11.

A synopsis of FIGS. 2 to 4 illustrates the redundancies present in the prior art relating to the torque transmission from the bicycle chain 2 via the sprockets 13, 15 to the driver 11. It can be seen that within the sprocket cassette there are no fewer than nine radial transmission paths 9 for the torque, since each of the eight plug-in sprockets 13 and moreover the sprocket spider 14 each have a dedicated radial torque transmission path 9 from the respective sprocket toothing to the driver.

This results in the large number of, here nine, torque transmission paths 9 arranged parallel to one another, but which are only alternatively used and thus redundant, with a correspondingly high material costs and thus a high weight of the sprocket cassette 1.

Figure 6:
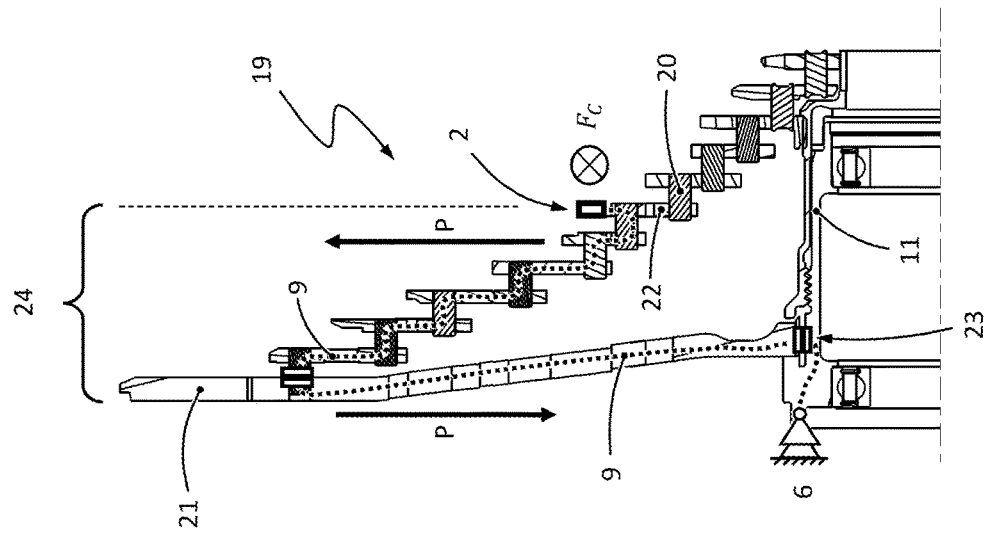
FIG. 6 shows a sprocket arrangement with a pinned sprocket cluster according to the prior art, in a schematic sectional view.

In contrast to the prior art sprocket cassette with plug-in sprockets and a sprocket spider shown in FIGS. 2 to 4, FIGS. 5 and 6 show examples of prior art sprocket cassettes that are designed as sprocket clusters. Here, the sprocket cassette according to FIG. 5 comprises a sprocket cluster 18 milled from one piece of solid material, whereas the sprocket cassette according to FIG. 6 is a pinned sprocket cluster 19 which is thus composed of a large number of individual sprockets connected by pins 20. In both cases, the sprocket cluster 19 or 20 is in each case connected to a carrier sprocket 21.

Figure 5:
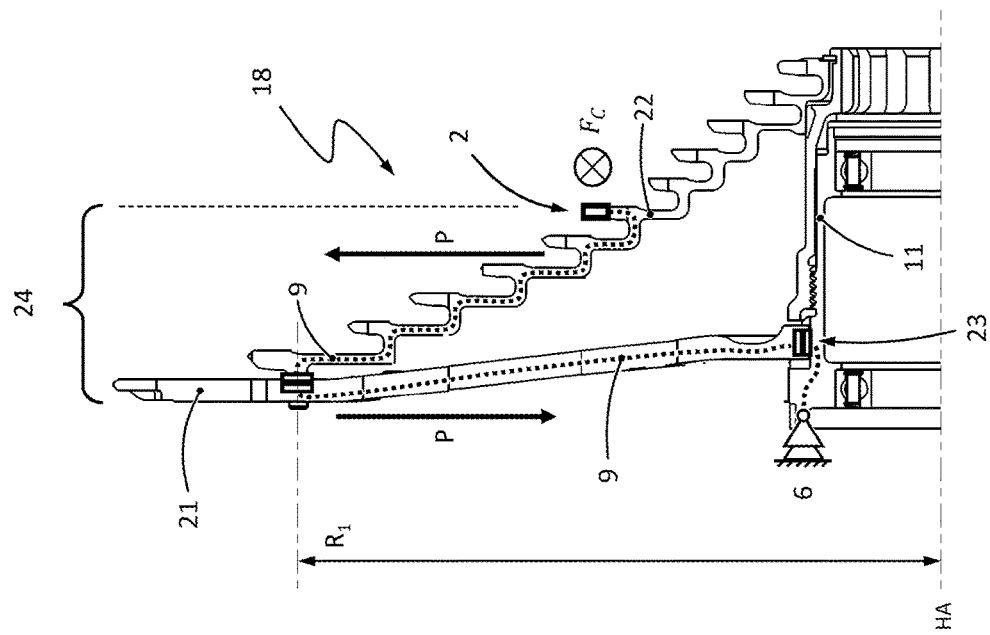
FIG. 5 shows a sprocket arrangement with a one-piece sprocket cluster according to the prior art, in a schematic sectional view.

In combination with FIG. 1, FIGS. 5 and 6 show on the one hand the enormous size that the sprocket clusters have now reached in such prior art sprocket cassettes. As a result, the clusters milled from solid material as shown in FIG. 5 require a very high manufacturing effort and thus correspondingly high costs. While pinned clusters shown in FIG. 6, pose greater challenges to production in terms of compliance with axial and radial concentricity tolerances, particularly due to the large number of connecting structures arranged in series, in this case no less than ten pin levels arranged between the eleven cluster sprockets, each with a large number of pins 20.

The force or torque flows 9 shown in FIGS. 5 and 6 serve to illustrate a further disadvantage of the prior art. Particularly in the case of sprocket cassettes for the single drives similar to FIG. 1 that have become standard on mountain bikes and also on e-bikes, the medium-sized sprockets in the central region of the cassette are used far more frequently than the large and very large sprockets on the left-hand side, or than the small and very small sprockets on the right-hand side.

As an example of a particularly frequently used sprocket, FIGS. 5 and 6 show the chain placed at 2 on the sprocket 22 of seventh gear (counted in the usual way from inboard=left to outboard=right). It can be seen that the force flow 9 from the currently used sprocket 22 via all the sprockets further to the left of the sprocket 22 is first directed radially far outward, and then has to cover an even further distance back to the radially inside via the carrier sprocket 21 to the interface 23 of the carrier sprocket 21 with the driver 11, see arrows P in FIGS. 5 and 6.

This long path covered by the force flow 9 is by no means only to be seen geometrically but leads in operation to an actual permanent or alternating loading of all the regions 24 of the sprocket cluster 18, 19, including the carrier sprocket 21, that are swept by the force flow 9.

The regions 24 which are situated to the left of the sprocket currently used in each case and which are thus swept by the force flow 9 in virtually all of the engaged gears must consequently be designed in terms of material fatigue or fatigue strength for this permanent alternating loading particularly in terms of bending under rotation, instead of only being able to be designed in terms of the loading in the case of the much more seldom actual use of the gears or sprockets situated in the region 24. This design which is required in the prior art thus also leads to an undesired increase in weight of the sprocket cassette.

The supporting radius $R_1$ depicted in FIG. 5 will be discussed further below in the description pertaining to FIG. 15.

Figure 7:
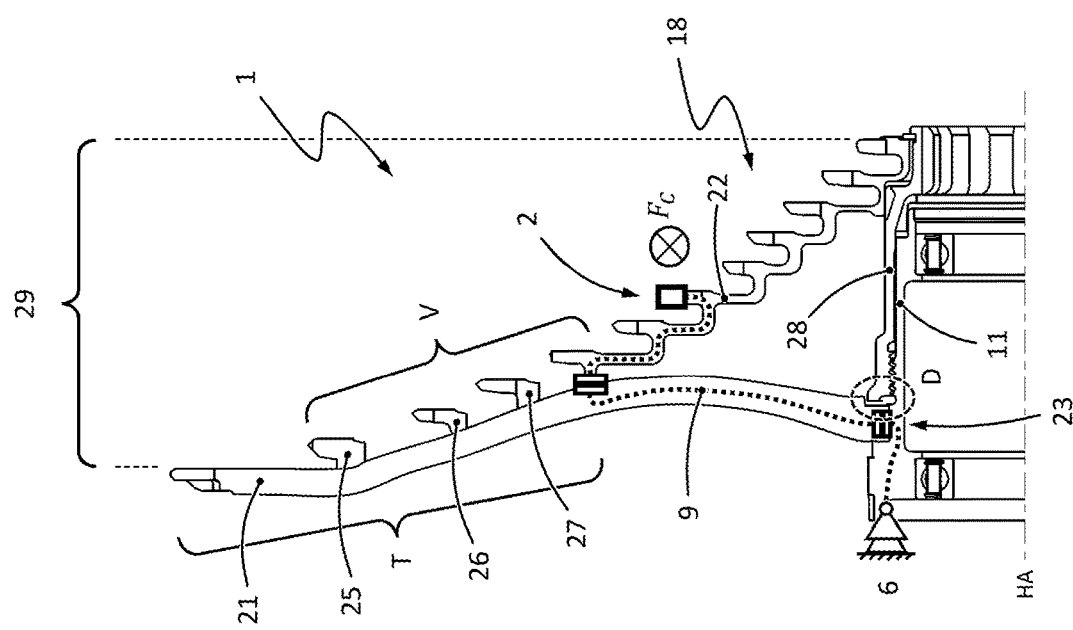

FIG. 7 shows a sprocket cassette or sprocket arrangement 1 according to one embodiment of the invention, in a situation corresponding to FIGS. 5 and 6, and again with the force flow 9 depicted. Here, as in FIGS. 5 and 6, the chain 2 is again placed on the seventh sprocket 22, corresponding to the seventh gear of the sprocket cassette 1.

Figure 8:
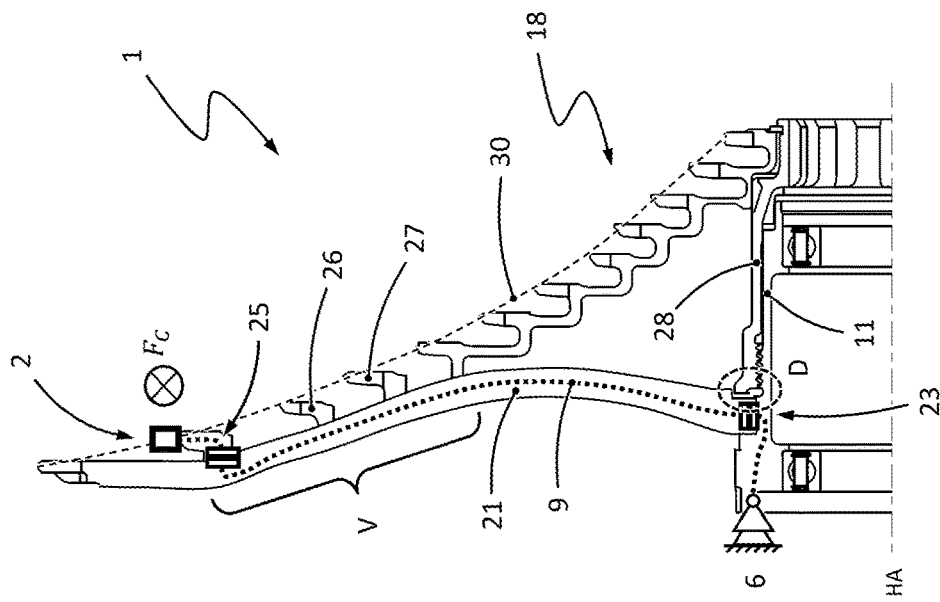
FIGS. 7-8 show a sprocket arrangement according to one embodiment of the present invention, each in a schematic sectional view.

FIG. 8 shows the same sprocket arrangement 1 as FIG. 7, with the difference that the chain 2 is here placed on the second sprocket 25, corresponding to the second gear of the sprocket cassette 1. Accordingly, FIG. 8 shows the force flow occurring in second gear from the chain 2 via the second sprocket or the sprocket ring 25 to the carrier sprocket 21, from the latter to the driver 11, and finally again at 6 to the rear wheel.

Apart from the carrier sprocket 21, FIGS. 7 and 8 show a sprocket cluster 18 (milled in one piece here) and a plurality (here three) of further sprockets which are designed as sprocket rings 25, 26 and 27 and which are connected to the carrier sprocket 21 in a connection region V of the carrier sprocket 21.

It can be seen that the sprocket cluster 18, in comparison with, for example, to the sprocket cassette according to the prior art according to FIG. 5, is reduced or decreased around the three large sprockets 25 to 27. Since the shape of the sprocket cluster 18 corresponds substantially to a truncated cone, the considerable reduction in both diameter and height in the illustrated exemplary embodiment, results in a reduction in the volume of the sprocket cluster by almost two thirds, with correspondingly large advantages in terms of manufacturability and manufacturing costs. The mass of the sprocket cluster is also decisively reduced in this way.

Instead of a milled sprocket cluster 18 as in the embodiment according to FIGS. 7 and 8, it is possible, for a further envisaged embodiment (not shown), to optionally also used a pinned sprocket cluster (cf. FIG. 6) and connect it to a carrier sprocket according to FIGS. 7 and 8.

It can be seen from a combination of FIGS. 7 and 8 with FIG. 6 that the problem of the long tolerance chains due to the numerous pin levels between the cluster sprockets, which exists in the prior art with pinned clusters as shown in FIG. 6, can be significantly reduced by the reduced cluster size. Particularly in the case of pinned clusters there thus results, with an acceptable manufacturing costs, a sprocket cassette having considerably improved concentricity and higher stiffness.

Particularly when using a pinned cluster (cf. FIG. 6), and to a somewhat lesser extent also with a milled cluster according to FIGS. 7 and 8, there is also an improvement in the axial tolerance situation of the entire sprocket cassette 1 due to the tolerance chains reduced by the smaller cluster.

This manifests itself by the fact that it is possible by means of this disclosure to reduce the differential gap D, which is necessary for play-free mounting of the sprocket cassette 1 under axial preloading, between the axial dimensions of lock tube 28, driver 11 and carrier sprocket 21 that are relevant for the axial tolerance chain. This also reduces the changes in the front face spacings 29 of the tooth geometry that result from the axial preloading of the cassette during mounting thereof, during which the axial differential gap D is closed, thus improving the shifting precision of the cassette.

A combination of FIG. 7 with FIG. 5 shows in which way the force flow 9 is improved and shortened by this disclosure in relation to the prior art. In the exemplary embodiment according to FIGS. 7 and 8, this is manifested by the fact that the three large sprockets 25 to 27, and also the largest, radially outer part T of the carrier sprocket 21, are, by contrast with the prior art according to FIG. 5, taken out of the force flow of the most frequently used sprockets in the central region of the cassette 1. It is thus possible for these regions, in this case the sprockets 25 to 27 as well as the radially outer part T of the carrier sprocket 21, to be designed substantially on the basis of their own expected frequency of use during riding operation, thus on the basis of significantly reduced long-term loading and with a correspondingly considerably lower weight.

FIG. 8 also schematically shows the envelope curve 30 of the tooth tips or tooth tip contour of the embodiment of the sprocket cassette 1 that is illustrated in FIGS. 7 and 8. It can be seen that the toroidal curvature or dishing of the carrier sprocket 21 leads to the fact that a cross-sectional contour of the carrier sprocket 21 follows the tooth tip contour 30 approximately parallel (in the sense of a parallel curve) in the connection region V, in which the carrier sprocket 21 is connected to the sprocket rings 25 to 27 and to the sprocket cluster 18. As shown, this leads to maximally shortened connection paths and force flows between the sprocket rings 25 to 27 or between the sprocket cluster 18 and the carrier sprocket 21, and to correspondingly minimized material use and weight for the sprocket cassette.

FIG. 9 schematically shows a graphic superimposition of the carrier sprocket 21 according to the embodiment from FIGS. 7 and 8 with a cluster cassette according to the prior art according to FIG. 6. The principle shown in FIG. 9 and the associated advantages equally apply in comparison with a milled sprocket cluster 18 according to the prior art as shown in FIG. 5.

FIG. 9 shows that the toroidal dishing of the carrier sprocket 21 frees up a considerable degree of installation space in the region A between the spokes 31 of the rear wheel 6 (cf. FIG. 1) and the carrier sprocket 21. This installation space can accordingly be used for other assemblies or functions, for example for the right spoke flange (not shown), or for mounting an additional sprocket, which is even larger than the carrier sprocket 21, on the left side (with reference to the drawing) of the carrier sprocket 21 to further increase the number of gears and the transmission ratio range of the sprocket cassette 1.

Figure 10:
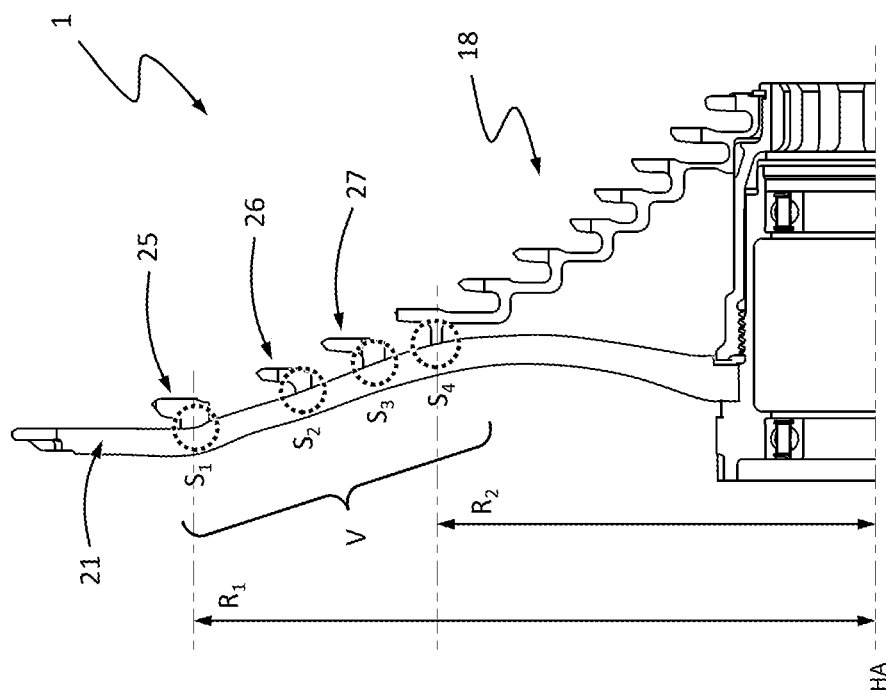
FIG. 10 shows the embodiment according to FIGS. 7 and 8 in an illustration intended to illustrate a modular system, in a schematic sectional view.

FIG. 10 schematically shows the principle of a modular system for sprocket cassettes 1. In the exemplary embodiment shown, there are defined for this purpose assembly series for the carrier sprocket 21, for each of the sprocket rings 25-27 and for the sprocket cluster 18, which can each comprise different configurations, materials, production forms or qualities of the respective assembly (i.e., of the carrier sprocket 21, each of the sprocket rings 25-27 and of the sprocket cluster 18).

Within each assembly series, the interfaces $S_1$ to $S_4$ are each defined uniformly in a shape-corresponding manner or are defined to mechanically correspond. In other words, this means that within each assembly series, the corresponding assembly can be exchanged for an assembly of different material, manufactured in a different way or different quality, while the other assemblies remain unchanged.

For example, it is intended to provide different carrier sprockets of different materials, for example of steel, aluminium and titanium, and/or carrier sprockets having different surface treatments within the "carrier sprocket" assembly series. While maintaining the remaining assemblies, i.e., the sprocket rings 25-27 and the sprocket cluster 18, a plurality of sprocket cassettes 1 for different applications and of different quality can be provided in this way with little development and manufacturing effort.

The same applies accordingly to the other assemblies present in this exemplary embodiment, i.e., to each of the sprocket rings 25-27 and to the sprocket cluster 18. For each of these assemblies it is possible on the production side, in each case while maintaining all the other assemblies, to provide corresponding assemblies of different material or of a different manufacturing method or of different quality.

The same applies to the design of the sprocket cluster 18. This means that for example the "carrier sprocket" and "sprocket rings" assemblies are maintained unchanged, while a pinned sprocket cluster (cf. FIG. 6) is provided instead of the of the one-piece milled sprocket cluster shown in FIGS. 10 and 11.

Overall, the modular system thus affords a large number of variants for the sprocket cassette 1 that can in each case be suitable or optimized for different price segments or market segments and for associated use purposes, for example for occasional leisure use in a first market segment to extreme sporting use in a completely different market segment, without having to deviate from the basic design of the sprocket cassette, as exemplified by the embodiment according to FIG. 10.

FIG. 10 also illustrates a further embodiment of the modular system in which one of the connection interfaces of the carrier sprocket 21, here the connection interface $S_3$, is provided as a combination interface for selectively receiving a sprocket ring or a sprocket cluster.

This means that a sprocket cluster with a larger outer diameter than the sprocket cluster 18 shown in FIG. 10 can be attached at such a combination interface $S_3$ of the carrier sprocket 21. In this case, the radially further inner connection interface $S_4$ can remain unused. Alternatively, as depicted, a sprocket ring 27 can be fastened at the connection interface $S_3$, and a sprocket cluster 18 can be fastened at the further, radially further inner connection interface $S_4$ as shown in FIG. 10.

It can also be seen from FIG. 10 that the carrier sprocket 21 is additionally substantially supported or stiffened by the connection with the sprocket cluster 18 in the region of the connection interface $S_4$, in particular in comparison with sprocket cassettes with cluster structures according to the prior art, for example as shown in FIGS. 5 and 6. This improves the resistance of the carrier sprocket 21 to failure particularly as a result of buckling or kinking under high driving load. Accordingly, the carrier sprocket 21 can be reduced in size, which again benefits the desired low weight of the sprocket cassette.

The supporting radii $R_1$ and $R_2$ depicted in FIG. 10 will be discussed further below in the description pertaining to FIG. 15.

Figure 11:
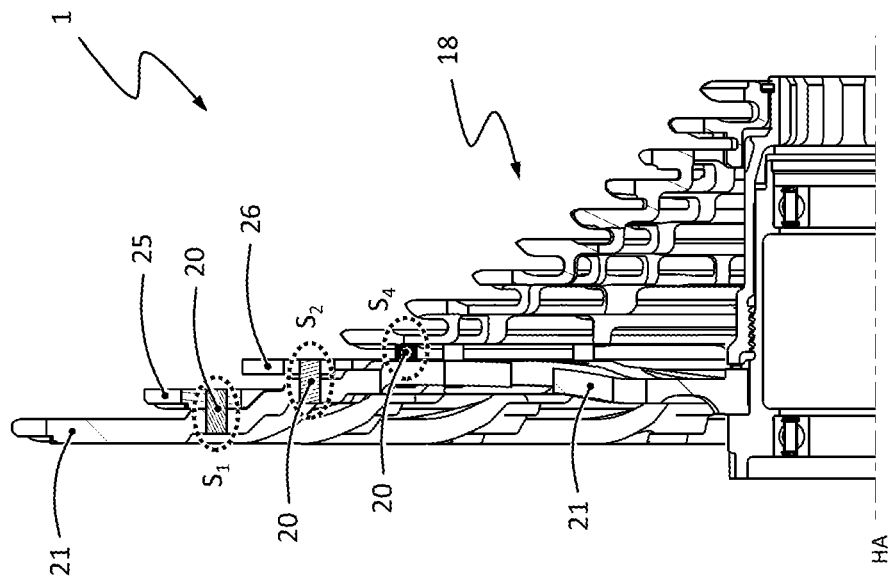
FIG. 11 shows an exemplary embodiment of the sprocket arrangement with a one-piece sprocket cluster and pinned sprocket rings, in a schematic sectional view.
Figure 12:
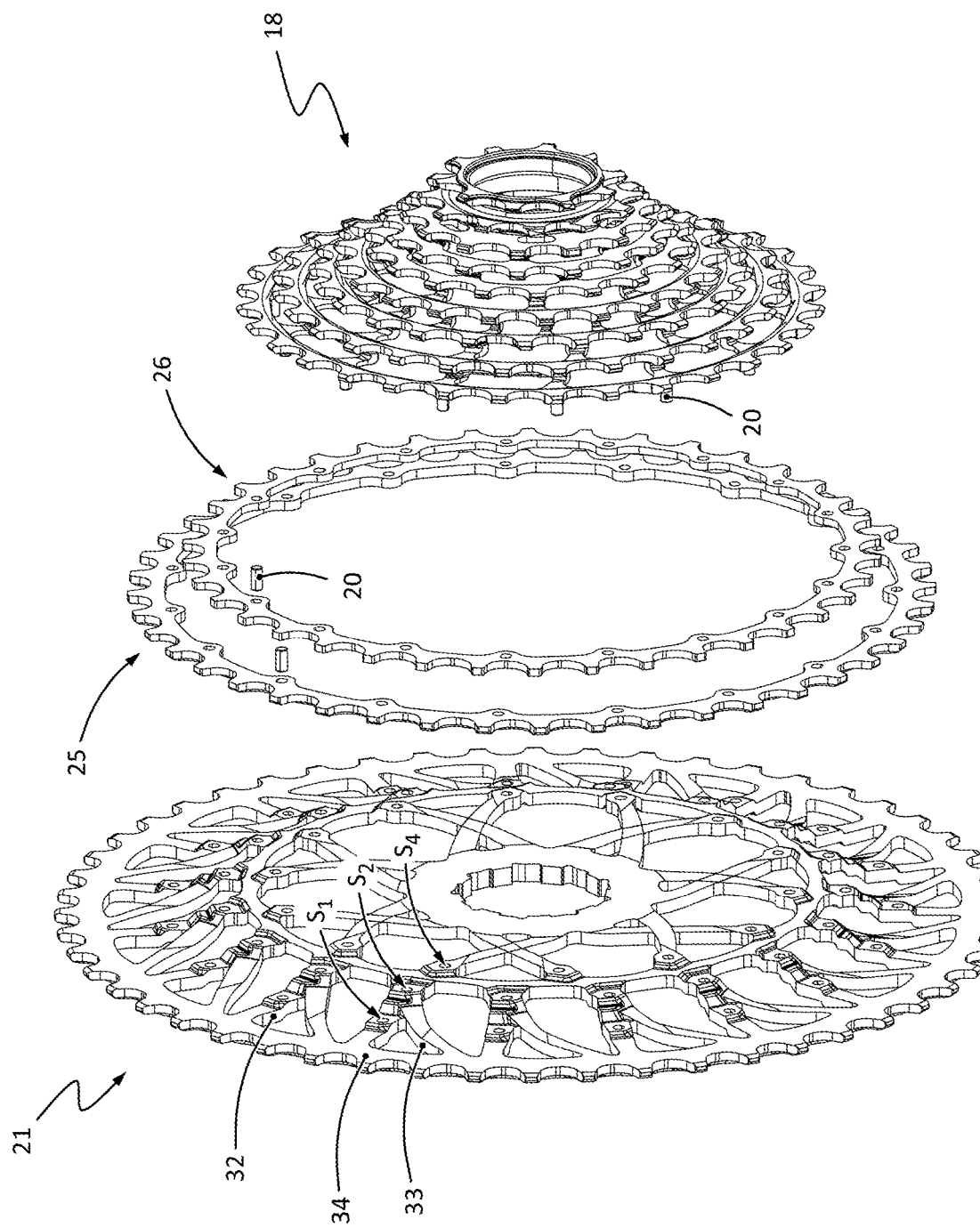
FIG. 12 shows the exemplary embodiment according to FIG. 11 in an exploded view.

FIGS. 11 and 12 show an exemplary embodiment of a sprocket arrangement according to one embodiment of the invention in a cross section (FIG. 11) and in an exploded view (FIG. 12). This is a sprocket arrangement having a one-piece sprocket cluster 18 and having sprocket rings 25, 26, which are pinned to the carrier sprocket 21.

In the illustrated embodiment of the sprocket arrangement or of the modular system, the connection interfaces $S_1$, $S_2$ and $S_4$ are defined for all of the assembly series present here, i.e., for the "carrier sprocket 21" assembly series, for the two "sprocket ring 25" and "sprocket ring 26" assembly series and for the "sprocket cluster 18" assembly series, in each case in the form of a large number of pins 20 which are each arranged so as to be distributed along an imaginary pitch circle.

It can be seen particularly in FIG. 12 that, for each of the aforementioned assembly series, the respective assembly can be exchanged for an assembly of different material or of different quality without the remaining assemblies having to be modified or significantly adapted. For example, instead of the sprocket cluster 18 milled here from one piece of steel, it is equally possible to provide a pinned sprocket cluster (cf. FIG. 6) so as in this way to provide a sprocket cassette for a different price segment or market segment. The same applies to the other assemblies, i.e., to the sprocket rings 25 and 26 and to the carrier sprocket 21.

It can also be seen in FIG. 12 that the sprocket rings 25 and 26 are configured with minimal height in the radial direction, which is made possible in particular by the dishing of the carrier sprocket 21. In this way, the weight of the sprocket cassette can be further minimized.

In this embodiment, a further particular property of the carrier sprocket 21 consists in the configuration of the connecting arms 32 and 33, which connect the connection interfaces $S_1$ and $S_2$ to the teeth region 34 of the carrier sprocket 21. It can be seen that the connecting arms 32 between the teeth region 34 and the radially further outer connection interfaces $S_1$ extend largely without an axial component in the radial direction, while the connecting arms 33 between the teeth region 34 and the radially further inner connection interfaces $S_2$ have, in addition to a radial profile component, also a profile component in the circumferential direction and in particular a profile component in the axial direction. The latter leads to the carrier sprocket 21 obtaining increased resistance to undesired bending or buckling in the region of the connection interfaces $S_1$ and $S_2$.

FIGS. 13 to 19 show the carrier sprocket 21 of a further embodiment of the sprocket arrangement. Differences over the embodiment of the carrier sprocket 21 according to FIG. 12 exist in particular in the design of the radially inner carrier arms 35 which here, first of all, are not curved as in the embodiment according to FIG. 12 but rectilinearly or run in a straight line. Furthermore, the number of these carrier arms 35, which connect an intermediate ring 36 of the carrier sprocket 21 to a hub region 37 of the carrier sprocket 21, in relation to the embodiment according to FIG. 12 is reduced by half since, in the embodiment according to FIG. 13, only those carrier arms are present which, as viewed in the direction of rotation D, extend with a forward inclination from radially outward to radially inward.

On the one hand, this reduces the weight compared to the embodiment according to FIG. 12. On the other hand, the only forwardly inclined profile of the carrier arms 35 in the carrier sprocket 21 of the exemplary embodiment according to FIG. 13 leads to the fact that the carrier sprocket 21 is additionally stiffened by the torque applied by the chain (not shown here) in the direction of rotation D by virtue of pressure forces F being produced in the carrier arms 35 on account of their forward inclination.

A circumferential component, which extends in the circumferential direction or direction of rotation D, of these pressure forces F in the carrier arms 35 transmits the driving torque from the chain via the teeth region 34 and also via the connecting arms 32, 33 and via the intermediate ring 36 to the hub region 37, whereas a radial component, which extends in the radial direction R, of these pressure forces F uniformly presses the intermediate ring 36 with respect to the hub region 37 radially outwards. This in turn produces a circumferential tensile force Z in the intermediate ring 36 that stabilizes the carrier sprocket 21 and thus counteracts lateral buckling of the carrier sprocket 21 as a result of axial forces on the teeth region 34 in particular during skewed running of the chain.

Figure 13:
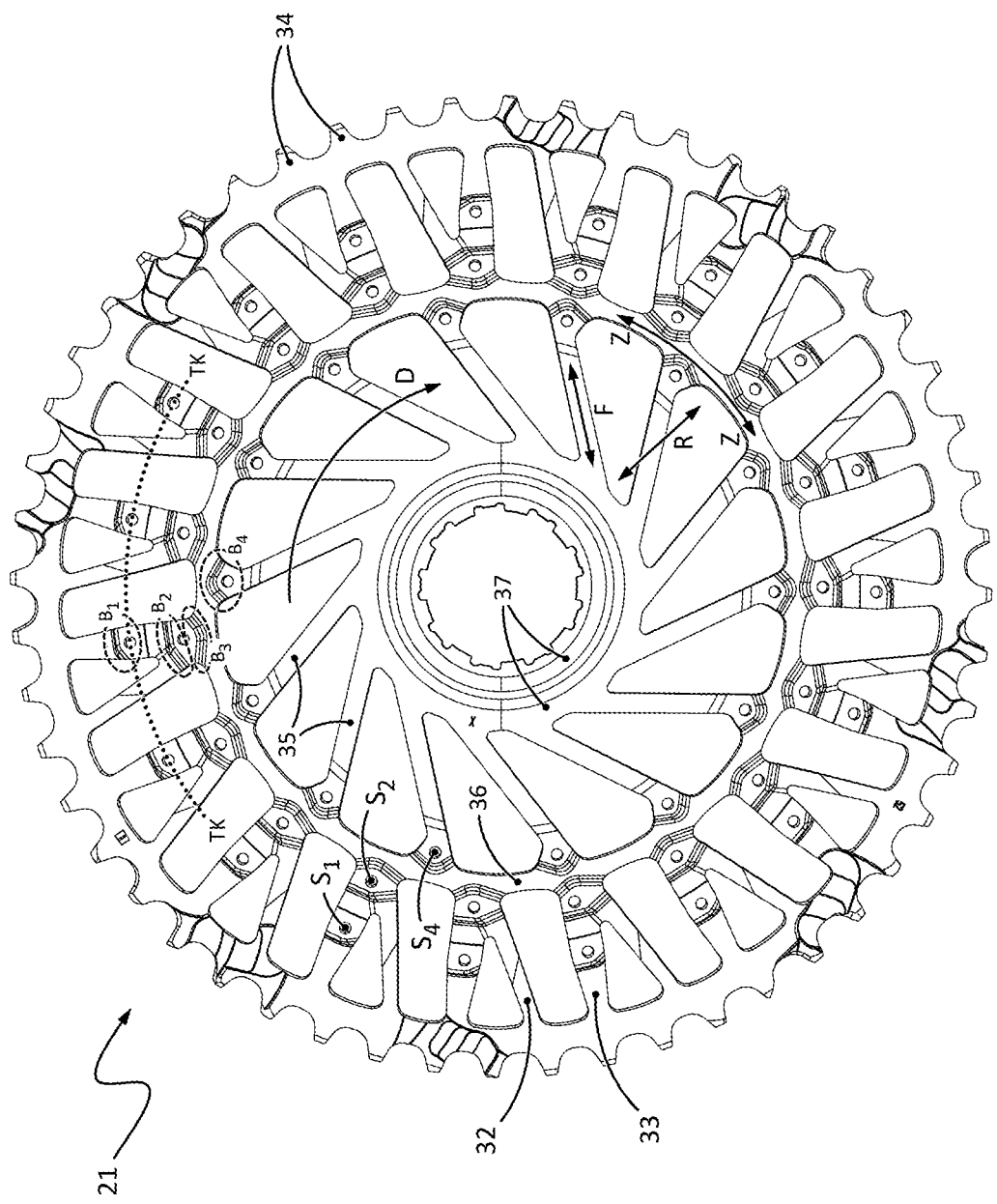
FIG. 13 shows an outboard view of a carrier sprocket of a further embodiment.

Furthermore, FIG. 13 also shows the connection interfaces $S_1$ and $S_2$ for connecting the carrier sprocket 21 to sprocket rings 25, 26, and the connection interface $S_4$ for connecting the carrier sprocket 21 to a sprocket cluster 18, as illustrated in FIGS. 7 and 8 and also FIGS. 10 to 12.

The regions $B_1$, $B_2$, $B_3$ and $B_4$ of the carrier sprocket 21 and also the pitch circle TK will be discussed further below in the description pertaining to FIG. 15.

Figure 14:
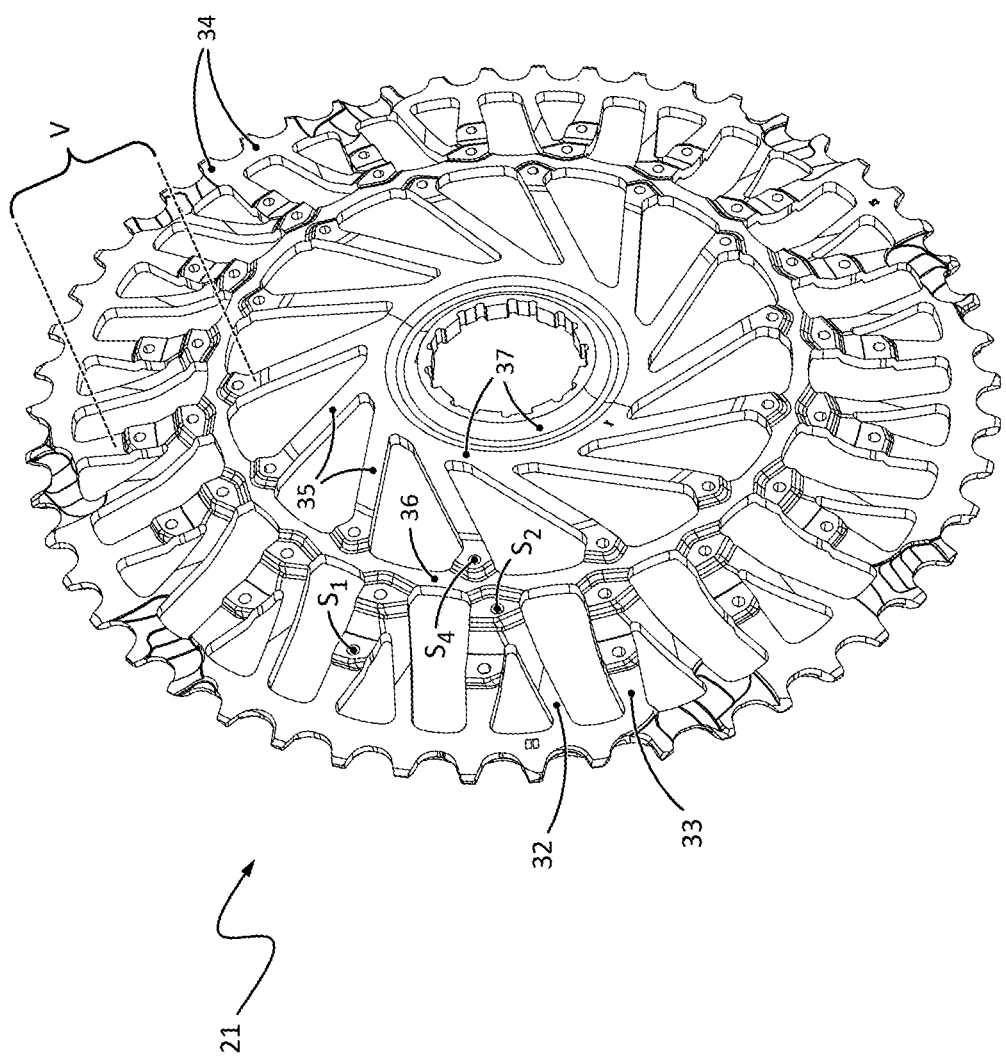
FIG. 14 shows a perspective outboard view of the carrier sprocket according to FIG. 13.

FIG. 14 shows the carrier sprocket according to FIG. 13 once again in a perspective view as viewed from the outboard. There can again be seen the toroidal dishing of the carrier sprocket 21 that leads to the fact that a cross-sectional contour of the carrier sprocket 21, in the connection region V (cf. FIGS. 7, 8 and 10) in which the carrier sprocket 21 is designed by way of the connection interfaces $S_1$, $S_2$ and $S_4$ for connection to sprocket rings 25 to 27 and to the sprocket cluster 18 (cf. FIG. 12), follows the tooth tip contour 30 approximately parallel, as can also be seen in particular from FIGS. 7, 8 and 10.

Figure 15:
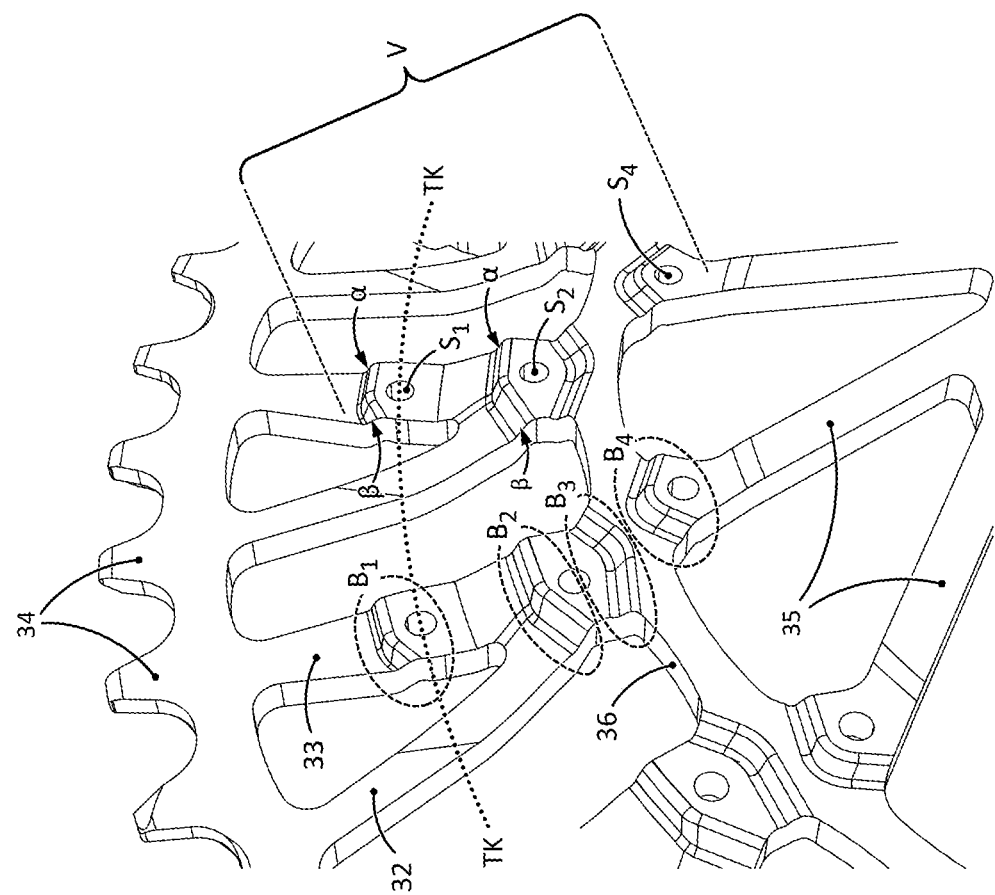
FIG. 15 shows an enlarged view of a portion of the carrier sprocket according to FIGS. 13 and 14.

FIG. 15 shows an enlarged view of the carrier sprocket 21 according to FIGS. 13 and 14. There can first of all again be seen the connection region V (cf. FIGS. 7, 8 and 10) in which the connection interfaces $S_1$, $S_2$ and $S_4$ for connection to the sprocket rings 25 to 27 and to the sprocket cluster 18 (cf. FIG. 12) are arranged, and furthermore the structure of the carrier sprocket 21, comprising radially inner carrier arms 35, intermediate ring 36, radially outer connecting arms 32 and 33, and also teeth region 34.

The carrier sprocket 21 according to the embodiments as shown in FIGS. 7 to 19 is, unlike in the case of sprocket cassettes with sprocket cluster known from the prior art, no longer supported on a comparatively large supporting radius $R_1$ (cf. FIGS. 5 and 10) by the very large prior-art sprocket cluster, in particular to counter lateral buckling of the carrier sprocket 21 in the rear axle axial direction as a result of forces which occur with skewed running of the chain from the engaged gear on the sprocket cluster on the rear wheel to the front chainring on the bottom bracket.

This means that the carrier sprocket 21 according to the embodiments as shown in FIGS. 7 to 19 must be designed to be stiffer than known carrier sprockets 21, for example as shown in FIGS. 5 and 6, in particular in the radially outer region of the carrier sprocket 21 in the region of the connecting arms 32 and 33.

For this purpose, the regions $B_1$, $B_2$, $B_3$ and $B_4$ of the carrier sprocket 21 in which the latter has in each case an offset in the rear axle axial direction in order to obtain the toroidal dishing visible in FIGS. 7 to 12 are designed in a specific way, as stated below, in order to obtain the highest possible stiffness of the carrier sprocket 21, in particular to counter lateral buckling.

For this purpose, the regions $B_1$ to $B_4$ of the carrier sprocket 21, in which an axial offset of the carrier sprocket 21 takes place in each case, do not run exactly along a circumferential pitch circle (cf. circumferential pitch circle TK in FIGS. 13 and 15) of the carrier sprocket 21. Instead, the folds or offsets there in the rear axle axial direction each have a kinked profile in the circumferential direction. In this way, the kink in the profile of the arms 32, 33 and 35 that occurs in each of the regions $B_1$ to $B_4$ is smoothed, and the respective kink profile is distributed along a relatively large radial region.

An additional smoothing of the folds or of the respective kink, in the present case at least in the regions $B_1$ and $B_2$, results from the folding in the respective kink region $B_1$ or $B_2$ being effected in each case to be as flat as possible, or in different regions with different fold angles. It can be seen in FIG. 15 that the folding is effected both in the kink region $B_1$ and in the kink region $B_2$ on the right-hand side (with reference to the drawing) with a comparatively steep angle α of for example approximately 30°, whereas the respective folding on the left-hand side (with reference to the drawing) has been carried out with a comparatively flat angle β of for example approximately 45°. The steeper of the two angles, i.e., the 30° angle in the present exemplary embodiment, can also be 0° if the carrier sprocket 11 is produced by means of machining, for example. In each case, the buckling stiffness of the carrier sprocket 21 is further increased by the above-described use of different fold angles within the respective kink region $B_1$ to $B_4$.

In the region of the pitch circle TK on which the regions $B_1$ are located, the arms 32, 33 are additionally shaped in such a way that they extend there on different rear-axle axial planes, which further maximizes the stiffness of the carrier sprocket 21 against unwanted lateral buckling.

The latter is particularly evident from FIG. 16. FIG. 16 shows a section through the carrier sprocket 21 according to the embodiment shown in FIGS. 12 to 15, with the line X-X of the section being illustrated in FIG. 17 by a dashed line.

In FIG. 16, the course of the arms 32 and 33 can be seen, which are sectioned by the line X-X, in different radial heights. It can be seen from the section surfaces in FIG. 16 that the arms 32 and 33, which begin in the region $B_2$ (cf. FIG. 15) at the same axial position with respect to the rear axis HA, assume in their further radial profile in the outward direction at first a different axial profile, cf. the different rear axle axial position of the section surfaces $32_{S2}$ and $33_{S2}$ or of the section surfaces $32_{S3}$ and $33_{S3}$ in the rear axle axial direction HA, before they again assume the same position in the rear axle axial direction HA radially still further outward shortly before the transition into the teeth region 34; see section surfaces $32_{S1}$ and $33_{S1}$ in FIG. 16.

In addition, as a result of a regional twisting of the arms 32, which is visible in FIG. 16 by way of the section surface $32_{S2}$, the area moment of inertia of the arms 32 in this radial portion of the arms 32, and thus the bending and buckling resistance of the carrier sprocket 21, is further increased.

Figure 18:
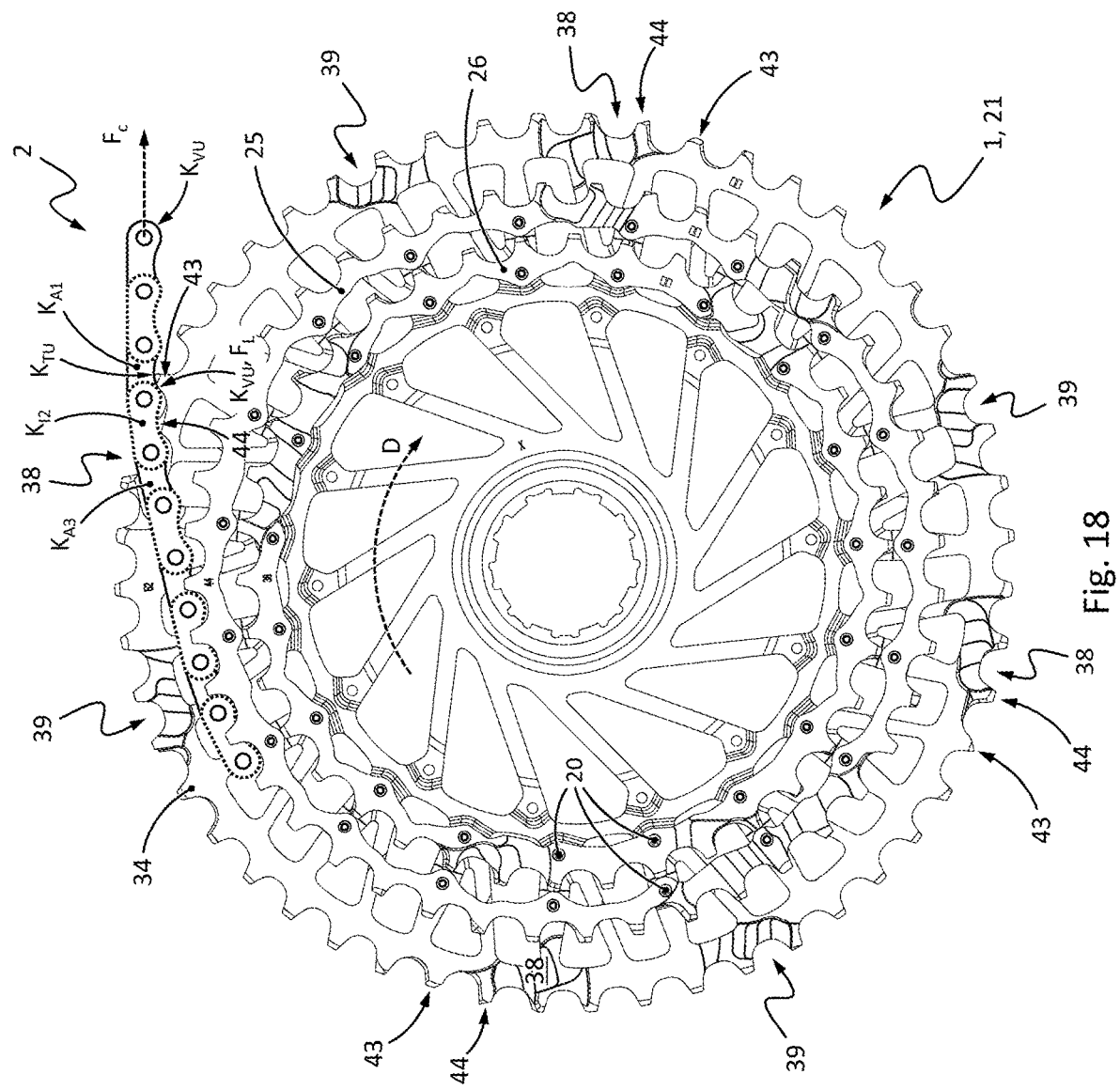
FIG. 18 shows the profile of a load-bearing chain strand during outboard shifting from the carrier sprocket to a next smallest sprocket.

FIG. 18 shows the carrier sprocket 21 according to FIGS. 13 to 17 and also two sprocket rings 25, 26 which are attached to the carrier sprocket 21 by pins or rivets 20. Furthermore, FIG. 18 shows a load-bearing strand of the bicycle chain 2, which is under the driving force $F_C$.

In FIG. 18, only the rear (with reference to the drawing) halves of the chain links, i.e., the inboard-side or left chain link plates, as well as the rivets of the chain are shown, whereas the front (with reference to the drawing), i.e., outboard-side or right, chain link plates have been omitted in order to be able to show the engagement of the chain with the teeth 34 of the carrier sprocket 21 and with the teeth of the next smallest sprocket, namely the sprocket ring 25. Here, the chain outer link plates $K_{A1}$ are illustrated by a solid line, whereas the chain inner link plates $K_{I2}$ are illustrated by a dotted line.

FIG. 18 shows the last moment of the transfer of the chain from the carrier sprocket 21 to the next smallest sprocket ring 25 during outboard shifting, in this case from the slowest gear of the sprocket cassette to the next higher gear. For this outboard shifting operation, the carrier sprocket 21 has special recesses or shifting aids, so-called outboard shifting lanes 38.

Figure 19:
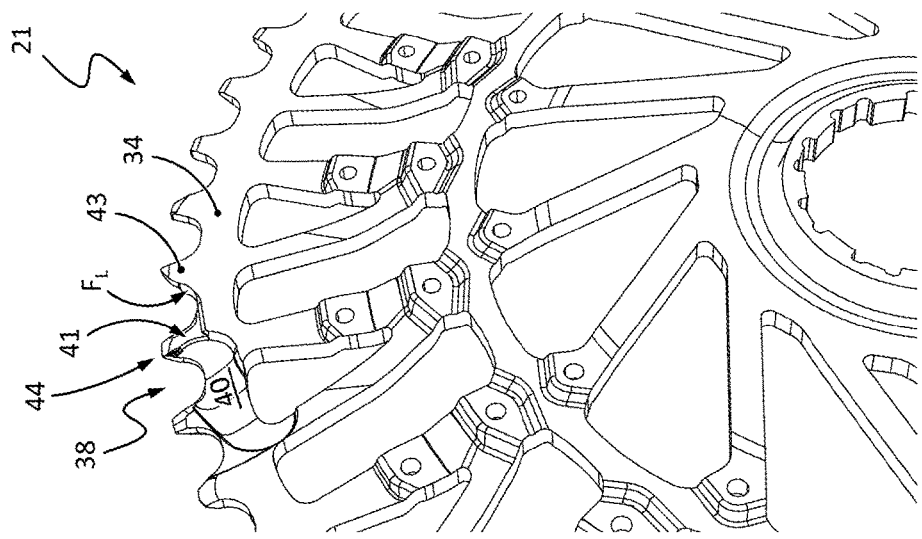
FIG. 19 shows an enlarged view of a portion of the carrier sprocket showing an outboard shifting lane of the carrier sprocket with the associated teeth geometry.

As can be seen in particular in the enlarged view of a portion of the carrier sprocket 21 in FIG. 19, the outboard shifting lanes 38 comprise specifically shaped, sunken recesses 40 and 41 which are arranged in the outboard-side surface of the carrier sprocket 21 in the region of the teeth 34. Here, during the outboard shifting operation, the recess 40 serves to receive the left chain outer link plate. In FIG. 18, this is the rear (with reference to the drawing) chain outer link plate $K_{A3}$. The recess 41 according to FIG. 19 serves for the reception or passage of the left chain inner link plate during the outboard shifting operation. In FIG. 18, this is the rear (with reference to the drawing) chain inner link plate $K_{I2}$.

The carrier sprocket 21 has on its circumference four uniformly distributed, substantially identical outboard shifting lanes 38. Furthermore, the carrier sprocket 21 has four inboard shifting lanes 39 which are likewise uniformly distributed along the circumference of the sprocket and which form shifting aids for the inboard shifting (not shown) from the second-largest sprocket 25 to the largest sprocket 21.

In FIG. 18, it is shown how the chain during the outboard shifting operation assumes the ideal state when shifting that is referred to in the sector as "tangential condition", in that the chain changes over from meshing engagement with the sprocket (here the larger sprocket 21) currently to be left into meshing engagement with the just-entered sprocket (here the next smaller sprocket 25) along a straight-line tangent to the smaller sprocket 25. Adherence to this tangential condition is desirable and extremely advantageous since it allows substantially noise-free and low-wear shifting even under load, in particular by minimizing or eliminating the so-called shift jerk.

The undesirable shift jerk can arise at the last moment of the leaving of the chain from the sprocket currently to be left (here the larger sprocket 21) if the chain is not previously tangentially stretched and tensioned as shown in FIG. 18, but runs over in a loose arc onto the currently entered sprocket (here the next smaller sprocket 25), so that the loose chain arc is abruptly tensioned with a jerk as soon as the chain disengages from the teeth of the larger sprocket.

FIG. 18 shows the moment of the disengagement of the chain from the teeth of the sprocket 21 currently to be left. In this moment, the front lower edge $K_{VU}$ of the left outer link plate of the load-bearing strand of the bicycle chain 2, which is under tensile stress due to the chain force or driving force $F_C$, is still in contact with the load flank $F_L$ of a so-called outer link plate clearance tooth or release tooth 43 of the sprocket 21 to be left (cf. FIG. 19).

The outer link plate clearance tooth or release tooth 43 is narrowed on its rear side (with reference to the drawing) (inboard side), i.e., it has a flattening or so-called clearance recess there that allows the left chain outer link plate $K_{A1}$ and thus the chain 2 in this region to be displaced sufficiently far outboard or to the right (out of the drawing plane of FIG. 18) relative to the sprocket 21 to be left during the outboard shifting operation.

This lateral displacement of the chain 2 in the region of the left chain outer link plate $K_{A1}$ or in the region of the release tooth 43 is necessary in order that the chain 2 initially still running on the sprocket 21 to be left can be deflected sufficiently far to the right, that is to say in the outboard direction, during the outboard shifting operation to ensure that the chain 2 can pass on the outboard side the inner link plate deflector tooth 44, which is next in the direction of rotation D, and can thus shift to the smaller sprocket 25. Otherwise, the chain could ride on the tooth tips of the larger sprocket 21, or there could be undesirable continued engagement of the teeth of the larger sprocket 21 in the link plate interspaces of the chain 2 without the chain shifting onto the smaller sprocket 25 at the location provided by the outboard shifting lanes 38.

In the moment of the rotation of the sprocket cassette 1 or of the shifting operation that directly precedes in time the situation illustrated in FIG. 18, the left chain outer link plate $K_{A1}$ is still situated on the left or on the inboard side, i.e., behind (with reference to the drawing) the outer link plate clearance tooth or release tooth 43, and slides, in the region of its clearance recess arranged on the rear side there, from radially inward to radially outward in the direction of the tooth tip of the release tooth 43.

In this moment, the frictional contact between the inner side of the left chain outer link plate $K_{A1}$ and the rear side of the release tooth 43 and/or a likewise frictional contact between the front lower edge $K_{VU}$ of the left chain inner link plate $K_{I2}$ and the load flank $F_L$ of the release tooth 43 (cf. FIG. 19) forms the only and last contact between the chain 2 and the sprocket 21 to be left.

In the moment of the rotation of the sprocket cassette 1 in the driving direction of rotation D that directly follows in time the situation illustrated in FIG. 18, the contact between the inside of the left chain outer link plate $K_{A1}$ and the rear side of the release tooth 43 ends, whereby the load-bearing strand of the chain 2 abruptly leaves the larger sprocket 21 completely. At this point, the load-bearing strand of the chain performs a slight jump laterally outboard, i.e., to the right, and from then on runs in a straight line both in the vertical direction and in the horizontal direction from the engagement with the teeth of the front chainring to engagement with the teeth of the sprocket 25 that has just been entered.

However, during this final leaving of the larger sprocket 21, there can occur lateral sliding or scraping of the front lower edge $K_{VU}$ of the left chain inner link plate $K_{I2}$ and/or of the lower waist edge $K_{TU}$ of the left chain outer link plate $K_{A1}$ on the load flank $F_L$ of the release tooth 43 (cf. FIG. 19) of the sprocket 21 to be left. This can lead to considerable loading of this load flank $F_L$ during shifting that possibly takes place under high load and thus under a high chain force $F_C$.

It has been recognized in this respect that this final jumping or lateral sliding of the load-bearing strand of the chain and thus of the front lower edge $K_{vu}$ of the left chain inner link plate $K_{I2}$ and/or of the lower waist edge $K_{TU}$ of the left chain outer link plate $K_{A1}$ on the load flank $F_L$ of the release tooth 43 very strongly loads or wears the load flank $F_L$ of the release tooth 43. This is all the more disadvantageous as the release tooth 43 additionally has the rear clearance recess, which further reduces the stability of the release tooth 43 and the effective width of its load flank $F_L$. Bending of the release tooth 43 in sprocket cassettes according to the prior art has been observed, due to this particular situation during outboard shifting.

For this reason, in the embodiment according to FIGS. 13 to 19, the release tooth 43 is given, in the region of its load flank $F_L$, by contrast with the standard load flank as can be seen on the other teeth of the sprocket 21, a bevelled shark tooth shape that is set back in the circumferential direction. This shaping of the load flank $F_L$ of the release tooth 43 can be seen particularly clearly in FIG. 19, and also in FIG. 18, for example in the case of the release tooth 43 positioned at the bottom (with reference to the drawing). With this shaping of the load flank $F_L$ of the release tooth 43, the contact between the front lower edge $K_{VU}$ of the left chain inner link plate $K_{I2}$ and/or the lower waist edge $K_{TU}$ of the left chain outer link plate $K_{A1}$ and the load flank $F_L$ of the release tooth 43 is minimized, as is also the associated loading or the associated wear.

Such a bevelled shark tooth shape can be provided not only in the release teeth 43 of the largest sprocket 21 but also in some or all of the further sprockets, apart from in the case of the smallest sprocket since no shifting therefrom in the outboard direction takes place.

The bevelled shark tooth shape of the release tooth 43 improves the shifting precision over the entire service life of the sprocket cassette 1, reduces shifting noise, reduces wear of the sprocket cassette 1 and chain 2, and thus increases the overall service life and reliability of the drivetrain.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A bicycle rear wheel sprocket arrangement comprising:
a carrier sprocket having a torque transmitting features;
a self-supporting sprocket cluster connected to the carrier sprocket on an outward side in a connection region of the carrier sprocket, the self-supporting sprocket cluster including a largest sprocket, a smallest sprocket and a plurality of intermediate sprockets therebetween, the self-supporting cluster forming a cone-shaped structure, wherein at least three of the plurality of intermediate sprockets are supported radially to each other; and
a plurality of further sprockets which are designed as sprocket rings, wherein the sprocket rings are each arranged on the carrier sprocket in the connection region and are each connected to the carrier sprocket in the connection region.

2. The bicycle rear wheel sprocket arrangement according to claim 1, wherein at least one of the sprocket rings is connected to the carrier sprocket by a plurality of connecting elements.

3. The bicycle rear wheel sprocket arrangement according to claim 1, wherein at least one of the sprocket rings is connected to the carrier sprocket by a material bond.

4. The bicycle rear wheel sprocket arrangement according to claim 1, wherein the carrier sprocket is formed in a dish shape such that in the connection region a cross-sectional contour of the carrier sprocket follows a tooth tip contour of the sprocket arrangement approximately parallel.

5. The bicycle rear wheel sprocket arrangement according to claim 1, wherein on one or more sprockets, a load flank of at least one outer link plate release tooth has a bevelled shark tooth shape setback in the circumferential direction for wear reduction during outboard shifting.

6. A modular system for producing different bicycle rear wheel sprocket arrangements, the modular system comprising:
at least one assembly series for at least one of a carrier sprocket, a self-supporting sprocket cluster and sprocket rings assemblies, the self-supporting sprocket cluster forming a cone-shaped structure, the self-supporting sprocket cluster including a largest sprocket, a smallest sprocket and a plurality of intermediate sprockets therebetween, wherein at least three of the plurality of intermediate sprockets are supported radially to each other; and
wherein connection interfaces are uniformly defined in a shape-corresponding manner within each assembly series so that at least one assembly, while maintaining the other assemblies, can be exchanged for another assembly from the same assembly series made of different material or of a different manufacturing quality.

7. The modular system according to claim 6, wherein at least one connection interface of the carrier sprocket is designed as a combination interface for selectively receiving the sprocket ring or the sprocket cluster.

* * * * *